(12) United States Patent
Scaldaferri et al.

(10) Patent No.: US 8,410,764 B2
(45) Date of Patent: Apr. 2, 2013

(54) AUTOMATIC CURRENT LIMIT ADJUSTMENT FOR LINEAR AND SWITCHING REGULATORS

(75) Inventors: Stefano Scaldaferri, Munich (DE); Eric Marschalkowski, Inning (DE); Christian Wolf, Neuffen (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 367 days.

(21) Appl. No.: 12/800,846

(22) Filed: May 24, 2010

(65) Prior Publication Data

US 2011/0121801 A1 May 26, 2011

(30) Foreign Application Priority Data

Nov. 23, 2009 (EP) .................................. 09368046

(51) Int. Cl.
G05F 1/00 (2006.01)
(52) U.S. Cl. ........................ 323/282; 323/273
(58) Field of Classification Search .................. 323/273, 323/285
See application file for complete search history.

(56) References Cited

U.S. PATENT DOCUMENTS

| | | | |
|---|---|---|---|
| 4,263,644 A | 4/1981 | Zellmer | |
| 6,297,617 B1 | 10/2001 | Aoyama | |
| 6,784,702 B1 * | 8/2004 | Chen | 327/110 |
| 7,254,044 B2 | 8/2007 | Perry et al. | |
| 7,262,585 B2 | 8/2007 | May | |
| 7,414,377 B2 | 8/2008 | Mayhew et al. | |
| 7,495,419 B1 | 2/2009 | Ju | |
| 7,710,700 B2 | 5/2010 | Young | |
| 2003/0095368 A1 * | 5/2003 | Daniels et al. | 361/93.9 |
| 2005/0162019 A1 | 7/2005 | Masciarelli et al. | |
| 2006/0164773 A1 * | 7/2006 | Stanford et al. | 361/93.1 |
| 2009/0160389 A1 | 6/2009 | Denk et al. | |
| 2010/0134084 A1 * | 6/2010 | Miyamae | 323/283 |
| 2010/0320974 A1 * | 12/2010 | Manlove et al. | 323/222 |
| 2011/0037446 A1 * | 2/2011 | Engelhardt et al. | 323/282 |

OTHER PUBLICATIONS 09368046.0-2207 European Search Report, Apr. 1, 2010, Diaog Semiconductor GmbH.
"Fully Integrated Switch-Mode One-Cell Li-Ion Charger with Full USB Compliance and USB-OTG Support," Texas Instruments Datasheet.

* cited by examiner

*Primary Examiner* — Adolf Berhane
*Assistant Examiner* — Emily Pham
(74) *Attorney, Agent, or Firm* — Saile Ackerman LLC; Stephen B. Ackerman

(57) ABSTRACT

Circuits and methods for dynamic adjustment of the current limit of a power management unit to avoid unwanted automatic interruption of the power flow have been disclosed. The power management unit is automatically adjusted to the output resistance of a power source (including interconnect resistance). The invention maximizes the time and hence the power transferred from a power management unit to the system (including the battery, in case of battery operated systems). The input current is reduced thus increasing the input voltage in case of a high voltage drop across the internal resistance including interconnections between power source and power management unit.

16 Claims, 5 Drawing Sheets

FIG. 1 – Prior Art

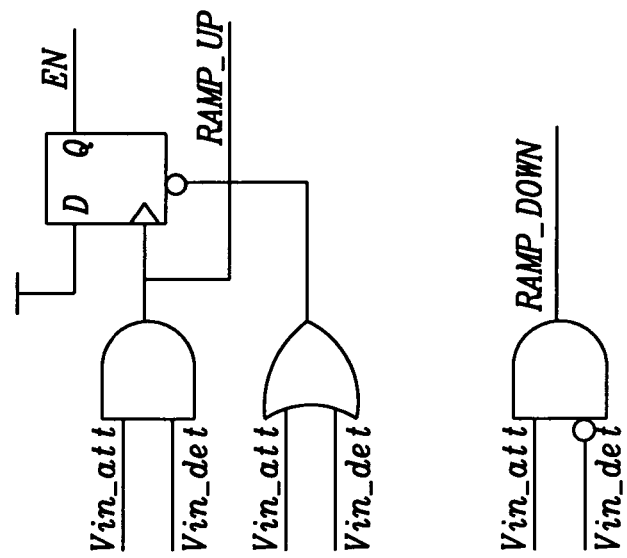
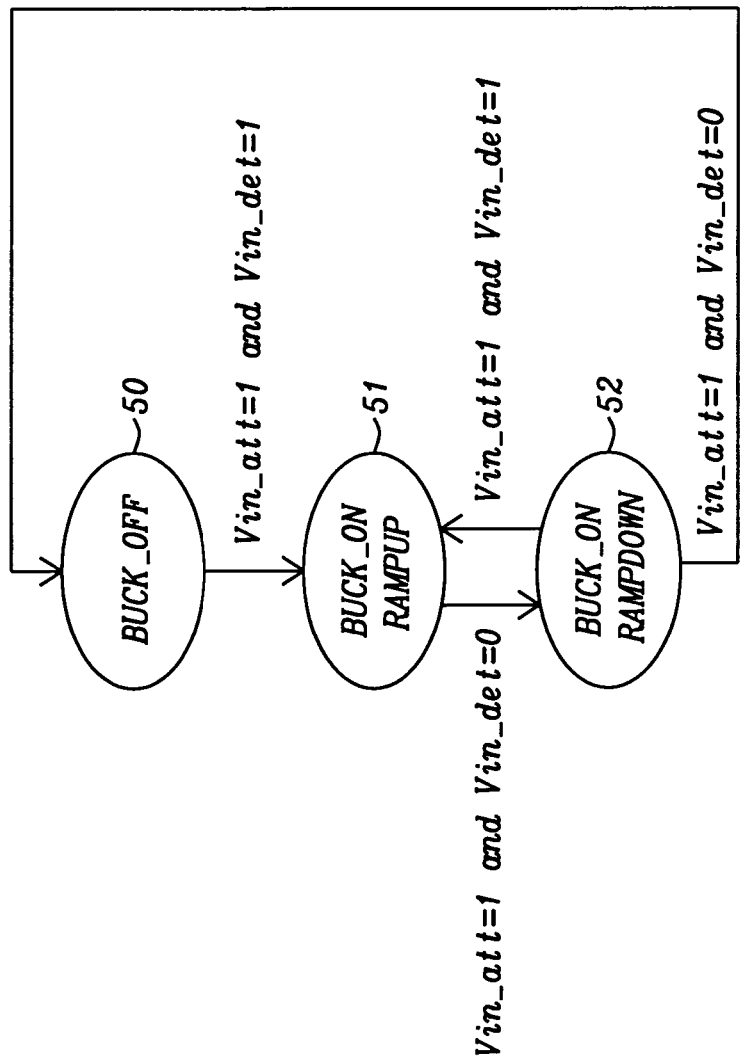
FIG. 5 even a load current generating an input current below the specified limit can lead to an interruption of the power flow and causes startup or operation failures.

AUTOMATIC CURRENT LIMIT ADJUSTMENT FOR LINEAR AND SWITCHING REGULATORS

BACKGROUND OF THE INVENTION (1) Field of the Invention

This invention relates generally to the field of supply voltage generators (linear regulators or DC-DC converters) and more specifically to those equipped with an input current limit control mechanism.

(2) Description of the Prior Art

Every modern integrated power management system has to be able to accommodate for a broad range of voltage sources (USB, 5V wall adapter, Firewire, automotive battery). Each of them comes in a variety of output specs, in particular regarding nominal output voltage and maximum current capability. The power management unit (PMU) has to guarantee that in every circumstance the load seen by the power source is within the specified ranges. This is generally done imposing an input current limitation on the PMU according to the kind of power source connected to it.

In FIG. 1 prior art a generic schematic of such a power management system is shown. The power source is represented by an ideal voltage source Vpwr with its intrinsic output resistance in series. The power source is then connected to the PMU through a connection cable whose length and resistance are not generally known a priori. The PMU itself is represented by a black-box system which is in charge of transferring the power from the source to a generic battery operated system, here represented by an I$_{CHG}$ load (current required to charge the battery) and an I$_{SYS}$ load (current required for the other system components).

In this scheme the voltage at the PMU input Vin is constantly monitored by a comparator. If the input voltage Vin falls below a certain threshold Vth, which represent the minimum limit specified for the particular power source connected to the PMU input, the power transfer between the power source and the system/battery is interrupted by disabling of the PMU.

This prior art scheme shows an undesired behavior in presence of high resistive interconnect (high Rcable due to long interconnection cable) or low budgetary power source (high source output resistance Rout). In this case even an input current below a specified maximum (Iin<Imax) leads the PMU input voltage to fall below the minimum voltage threshold Vth and by consequence to a disabling of the PMU. This event in turn reduces abruptly the input current to zero, thus allowing Vin to rise above the minimum voltage threshold again. The PMU will be re-enabled, the input current will increase again and the described process will repeat itself. This behavior is obviously unacceptable: even a load current generating an input current below the specified limit can lead to an interruption of the power flow and causes startup or operation failures. Furthermore the continuous PMU toggling between ON and OFF state will generate high frequency voltage/current transients that could interfere or damage other system components.

A typical situation reproducing a phenomenon like the one described above is the case in which the PMU is connected via a 1-Ohm cable to a high-power USB port. Assuming the USB voltage to be Vpwr=5.0V and the minimum voltage threshold to be Vth=4.4V (lower limit of the USB range), a charge current Ichg=1.0 A would reduce the voltage at the PMU input to Vin=4.0V thus leading to the PMU turnoff (the source output resistance has been neglected in this example).

There are patents or patent publications dealing with the operation of buck converters.

U.S. patent (U.S. Pat. No. 7,262,585 to May) discloses a power supply system having a transistor, a linear regulator, a DC-DC converter, and a control circuit. The transistor has an input, a substrate, a first node, and a second node. The first node is operably coupled to a non-battery power source. A linear regulator is operably coupled to the second node to produce a regulated output voltage based on the non-battery power source, when enabled. A DC-DC converter is operably coupled to produce the regulated output voltage based on a battery power source, when enabled. A control circuit is operably coupled to the input node and the substrate of the transistor wherein when the DC-DC converter is enabled, the control circuit controls a reverse leakage current of the transistor, and when the linear regulator is enabled in a zero load-state, the control circuit controls a forward leakage current of the transistor, and when the linear regulator is enabled in a non-zero load-state, the control circuit provides a current limit for the linear regulator.

U.S. patent (U.S. Pat. No. 7,254,044 to Perry et al.) proposes various embodiments of a power supply all including at least one DC/DC converter. The converter includes a primary switch controlled by a pulse width modulated control signal such that the primary switch is on for a D time period of each switching cycle of the converter and is off for a 1-D time period of each switching cycle. Also, the power supply includes a current sensing element connected in series with the primary switch. In addition, the power supply includes a current limit circuit connected to the current sensing element. The current limit circuit includes a functional circuit having a first input responsive to a first signal whose voltage is proportional to the output current of the converter during the D time period of the switching cycle of the converter. A second input of the functional circuit is responsive to a second signal whose voltage is proportional to the output current of the converter during the 1−D time period of the switching cycle of the converter. In that way, the voltage of the output signal of the functional circuit is proportional to the output inductor current of the converter over both the energy storage phase (the D interval) and the energy deliver phase (the 1−D) interval of the converter.

U.S. patent (U.S. Pat. No. 4,263,644 to Zellmer) discloses a switched DC-to-DC converter in a power supply being powered by input line current from an external power source and driven by voltage pulses from a variable duty cycle pulse width modulator for converting a DC input voltage to a DC supply voltage of a different value that is applied to a load impedance. A comparator monitors the supply voltage for producing an error voltage that biases the modulator for adjusting the width of the voltage pulses, and thus the duty cycle of the converter, for maintaining the supply voltage relatively constant. An RC circuit integrates the voltage pulses for producing an indication of the average value thereof, which is directly related to the value of line current drawn by the converter. When the average value of voltage pulses exceeds a reference voltage, the value of bias voltage is limited for establishing the maximum width of voltage pulses and duty cycle of the converter, and thereby limit the maximum line current drawn by the power supply.

U.S. patent (U.S. Pat. No. 7,414,377 to Mayhew et al.) describes a motor controller system comprising solid-state switches for connection between an AC line and motor terminals for controlling application of AC power to the motor. A sensor senses AC line voltage. A control circuit controls operation of the solid-state switches. The control circuit ramps switch current during a start mode and selectively holds switch current during the start mode if sensed voltage drops below a threshold amount.

Furthermore Texas Instruments has published an application note "Fully Integrated Switch-Mode One-Cell Li-Ion Charger with Full USB compliance and USB-OTG support" describing a charge management device for single cell batteries, wherein charge parameters can be programmed through an I²C interface. The bQ24150/1 charge management device integrates a synchronous PWM controller, power MOSFETs, input current sensing, high accuracy current and voltage regulation, and charge termination, into a small WCSP package.

SUMMARY OF THE INVENTION

A principal object of the present invention is to achieve a power management unit avoiding undesired interruption of input power flow.

A further object of the present invention is to achieve a power management unit adapting automatically to the internal resistance, including the interconnect resistance, of an input power source.

A further object of the present invention is to achieve a power management unit maximizing the power transferred from the power source to a system load (including a battery in case of battery operated systems).

Furthermore another object of the invention is to ensure the functionality of a power management unit even in condition of a low quality/high-output-resistance power source or high resistive cables between the power source and the power management unit input.

Moreover another objective of the invention is to maximize the time during which a power management unit can deliver power to a system/battery.

In accordance with the objects of this invention a method for maximizing DC power transferred by a power management unit to an electronic device has been achieved. The method invented comprises, firstly, the steps of: (1) providing a power management unit comprising means to sense an input voltage and an output voltage, means to sense an input current, means to control the input current limit and means to compare voltages, and a control unit, (2) connecting a power source to said power management unit, (3) checking if the input voltage is higher than the output voltage and if the input voltage is higher than a defined input threshold voltage, and if both checks are positive, go to step 4, otherwise repeat step 3, and (4) enabling power management unit. Furthermore the method invented comprises the steps of: (5) ramping up the input current, (6) checking, if the input current is lower than the defined maximal allowable input current limit, and, if positive, repeat the check of step (6), otherwise go to step (7), and (7) decreasing input current and go to step (6). Moreover the method comprises the steps of: (8) checking if an input voltage is higher than the defined input threshold voltage and, if positive go to step (9), else go to step (11), (9) checking, if the actual maximal allowable current limit is lower than the default value, and if negative, go to step (8), otherwise go to step (10), (10) increasing the maximal allowable input current limit and go to step (8), (11) decreasing the maximal allowable input current limit and go to step (8), (12) checking, if the input voltage is higher than the output voltage of the power management unit and, if positive, repeat step (12), otherwise go to step (13), and, finally, (13) disabling the power management unit.

In accordance with the objects of this invention a power management unit enabled for dynamic adjustment of an input current limit has been achieved. The power management unit comprises, first, a first voltage comparator, comparing an input voltage of the power management unit with a threshold voltage, wherein its output is used by a means of setting dynamically a maximum input current limit, a second voltage comparator, comparing an output voltage of the power management unit with said input voltage wherein its output is used by said means of setting dynamically a maximum input current limit, and a current comparator, comparing said input current with a reference current wherein its output is an input to a control block. Furthermore the system invented comprises a means of setting dynamically a maximum input current limit, a main input switch of the power management unit, and said control block controlling the operations of the power management unit.

BRIEF DESCRIPTION OF THE DRAWINGS

In the accompanying drawings forming a material part of this description, there is shown:

FIG. 5 illustrates the state diagram and a possible implementation of the control logic of the present invention.

DESCRIPTION OF THE PREFERRED EMBODIMENTS

The preferred embodiments disclose methods and systems to achieve a fully functional power management unit (i.e. a means of transferring power from a power source to a system/battery) even in presence of power sources having low quality/high-output-resistance and/or high resistive cables.

The preferred embodiments of the present invention discussed refer to a Power Management Unit (PMU) of a portable system, in which an input current limited DC-DC converter has to provide power to the needs of both a battery charger and a system load. These particular implementations should serve however only for explanation purposes and it is not intended to limit the field of application of the invention.

Figure 2:
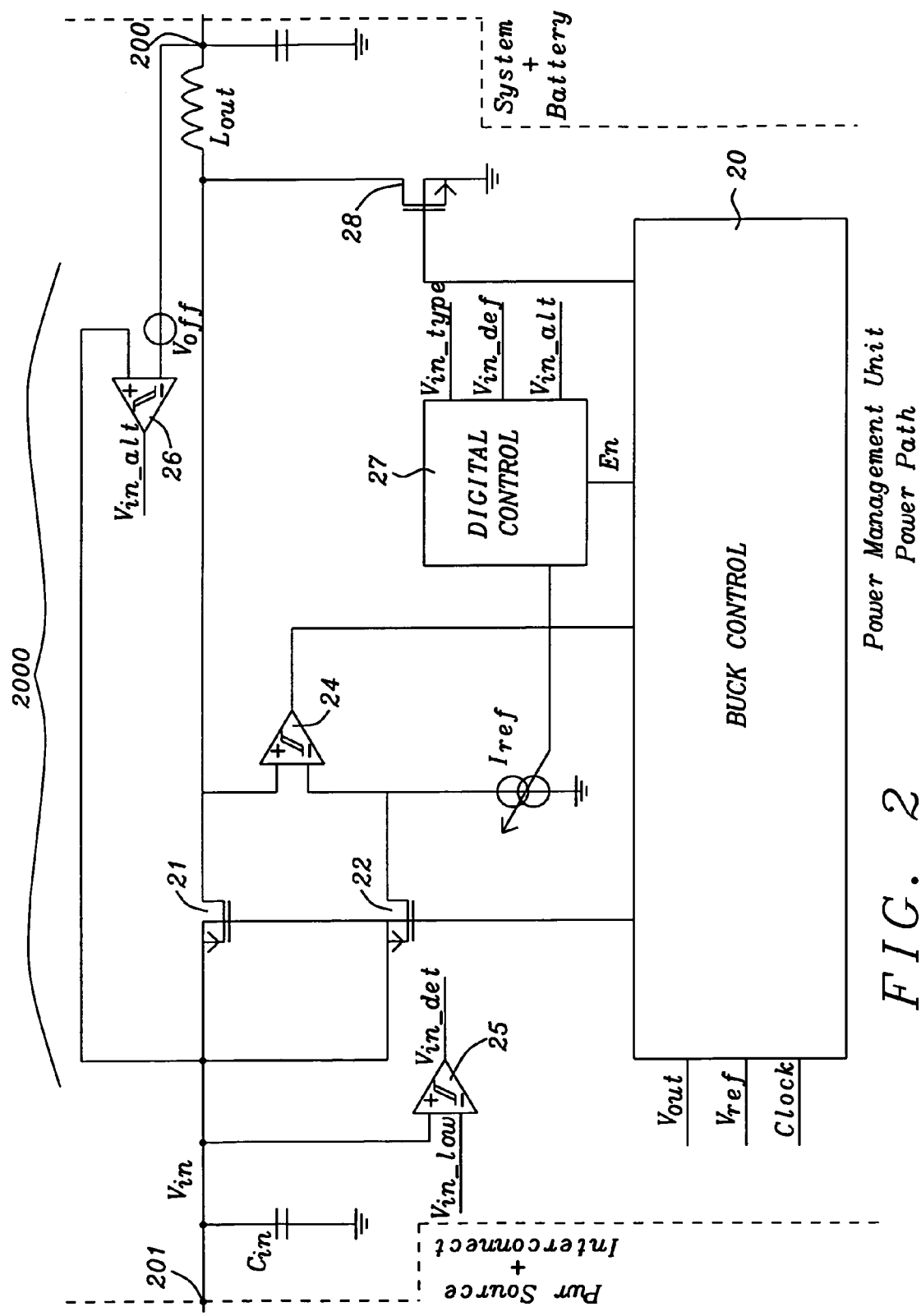
FIG. 2 illustrates a circuit of a dynamic current limit control scheme of the present invention.

The dynamic current limit control scheme of the present invention is depicted in FIG. 2. FIG. 2 shows a power path of a power management unit 2000. In a preferred embodiment of the invention a current limited buck converter is used to transfer the power from the power source to the system/battery load but this is not limiting the scope of the present invention, which would be applicable also to linear regulators as e.g. an LDO, i.e. the invention is applicable to linear and switching regulators.

The output port 200 is connected to a system and/or a battery; the input port 201 is connected to a power source via an interconnection.

The buck converter 2000, shown in FIG. 2, implements a cycle-by-cycle current limit.

In the particular implementation shown in FIG. 2 the input current is sensed through the drain-source voltage drop Vds generated on the main switch 21. Such a voltage drop is compared via the comparator 24 with the drain-source voltage drop Vds generated by a reference current $I_{REF}$ forced through a reference device 22, down-scaled by a factor M with respect to the main switch 21. As soon as the current in the main switch 21 exceeds the value of $I_{limit}=M*I_{ref}$ the comparator 24 will toggle forcing the buck control 20 to turn-off the main switch 21, hence preventing the input current to increase. In this way the peak current through the main switch 21 and by consequence the input current, is limited, the limit being given by the expression $I_{limit}=M*I_{ref}$. While the value of the scaling factor M is usually fixed by the main switch and reference device geometry, the reference current $I_{REF}$ depends, via the digital control 27, on the power source type $V_{in\_type}$.

Examples of power sources types are USB Low Power, USB High Power, Firewire Battery power, etc. They are categorized in terms of the maximum current, which can be drawn from them.

The information about the type of power source can be transferred e.g. via specific input ports for each power supply type (so that the power supply is recognized from the port it is attached to), or via a means to test the power supply output resistance, i.e. drawing a test current and sense the voltage drop on the source output terminal. The two methods can also coexist. Other methods are possible as well.

Right after the power supply is plugged in, two conditions must both hold in order for the system to enable the buck converter 2000:
1. The input voltage on the $V_{in}$ node rises above the minimum voltage $V_{in\_low}$ specified for the power supply, i.e. the detect comparator 25 toggles its output $V_{in\_det}$ from low to high;
2. There is enough overhead between the buck converter input and output voltage ($V_{in}>V_{out}$), i.e. the attach comparator 26 toggles its output $V_{in\_att}$ from low to high. In a preferred embodiment of the invention a small "overhead" voltage $V_{off}$ is added to the output voltage $V_{out}$ in order that $V_{in\_att}$ goes only high the input voltage $V_{in}$ is higher than the sum of the "overhead" voltage $V_{off}$ and the output voltage $V_{out}$ ($V_{in}>V_{out+}V_{off}$).

After the buck converter 2000 has been enabled, the reference current $I_{ref}$ and hence the input current limit, is ramped up to its default value, which is the current limit (limit specified for the specific currently active power supply.

In case a system load, even below the current limit $I_{limit}$ specified for the power supply, causes the voltage at $V_{in}$ to drop below $V_{in\_low}$, e.g. caused by to a high cable resistance or low quality power supply, the detect comparator 25 toggles ($V_{in\_det}$ goes low) but the buck converter 2000 is not disabled as long as $V_{in}>V_{out}$, i.e. as long as the attach comparator 26 does not toggle its output $V_{in\_att}$ from high to low.

In this state (attach comparator output high, detect comparator output low) the control loop of the present invention ramps the input current limit down in attempt to reduce the current load to the power source and bring the voltage at $V_{in}$ node again above the lower threshold $V_{in\_low}$.

The buck converter 2000 is kept enabled as long as it has enough overheads to deliver power to the system and/or battery, i.e. $V_{in}>V_{out+}V_{off}$, in this way maximizing the power transferred to the load. Only if $V_{in\_att}$ and $V_{in\_det}$ are both low, the buck converter is turned off, or in other words the buck converter 2000 is not disabled as long as $V_{in}>V_{out}$ even if $V_{in}$ drops below $V_{in\_low}$.

FIG. 5 illustrates the state diagram and a possible implementation of the control logic described in the present invention.

The initial state is the BUCK_OFF state 50, in which the buck converter is disabled (EN=0). The RAMP_UP 51, and RAMP_DOWN 52 signals are the commands by which the reference current Iref and by consequence the input current $I_{limit}$ are respectively ramped up to their default value or ramped down to their minimum values. When the buck converter is not enabled these signals have of course no effect.

As soon as the $V_{in\_att}$ and $V_{in\_det}$ go high in consequence of a power source plugged in, the system goes into the state BUCK_ON_RAMP_UP 51, in which the buck is enabled and the input current limit $I_{limit}$ is ramped to its default value.

If then, by consequence of a system load or a power source plug-out, $V_{in}$ drops below $V_{in\_low}$, $V_{in\_det}$ will go low and the system will enter the state BUCK_ON_RAMP_DOWN 52. In this state the buck converter is kept enabled but the input current limit is ramped down so to allow the voltage at the Vin node to recover.

In this state there may be two possibilities:
1. the voltage at the Vin node recovers and rises above the threshold $V_{in\_low}$ again: in this case the system will go back to the state BUCK_ON_RAMP_UP and the input current limit will be increased again to its default value.
2. the voltage at the Vin node doesn't recover and eventually falls even below the attach comparator threshold (Vin<Vout): in this case the system will fall back to the BUCK_OFF state 50, in which the buck is disabled.

Figure 3:
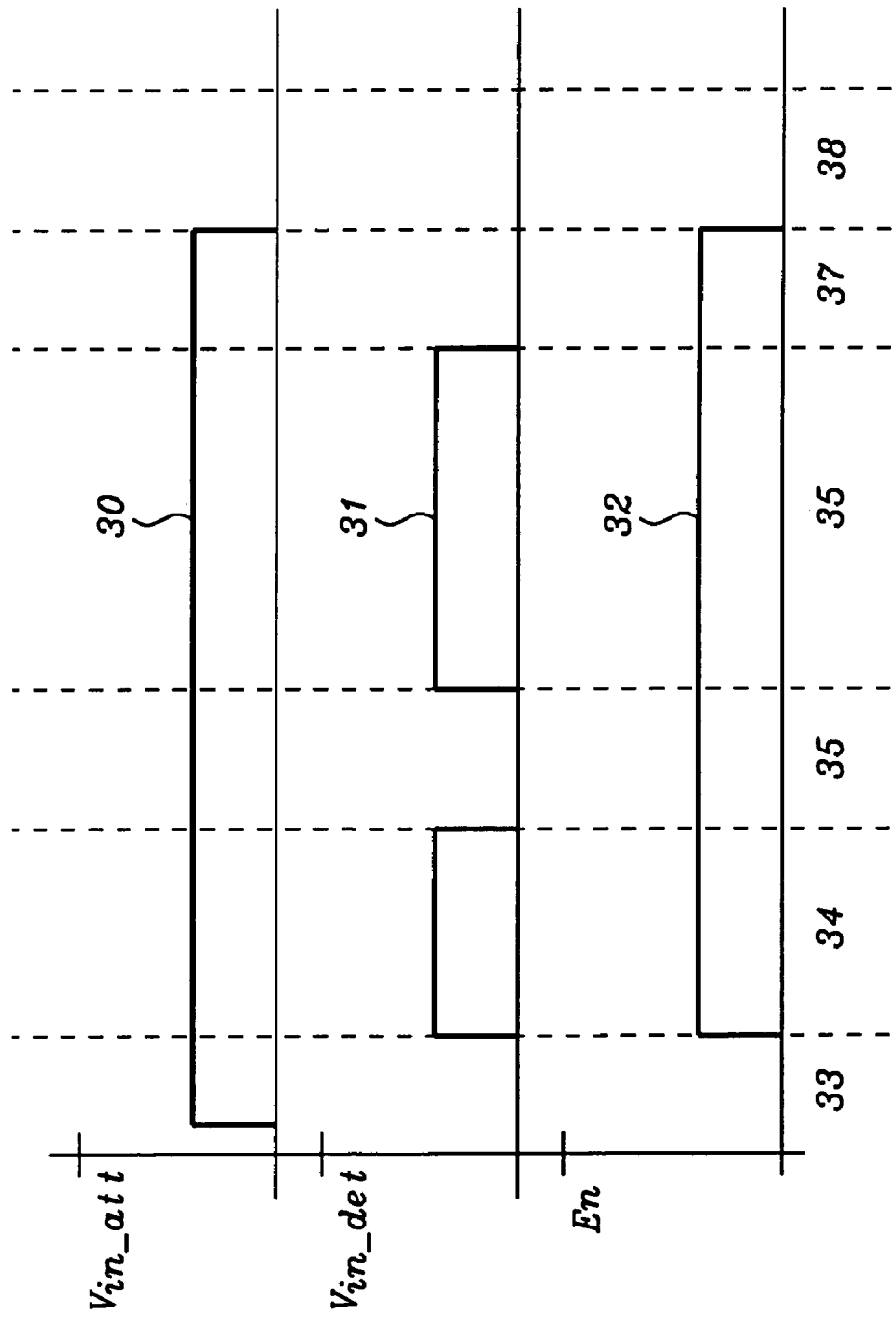
FIG. 3 illustrates the control logic of the present invention

FIG. 3 illustrates the timing diagram input and output signals of the control logic of the present invention for a typical power-cycle.

The top diagram 30 shows the output voltage $V_{in\_att}$ of the attach comparator 26. The diagram 31 in the middle shows the output voltage $V_{in\_det}$ of the detect comparator 25 and the diagram 32 at the bottom shows an output signal En of the digital control unit 27. The En signal is enabling the buck converter.

FIG. 3 illustrates six different phases 33-38 of a typical power cycle and the corresponding behavior of the system described in the present invention. The phases 33-38 comprise three states, namely BUCK_OFF, BUCK_ON RAMPUP, and BUCK_ON RAMP DOWN, as shown in FIG. 5, and transition phases between these three states.

Phase 33 describes a typical plug-in phase, wherein the buck converter is still in the BUCK_OFF state 50 as illustrated in FIG. 5. After a short period $V_{in\_att}$ goes ON because the input voltage $V_{in}$ is higher than the sum of the "overhead" voltage $V_{off}$ and the output voltage Vout In phase 34 the signal En 32 goes high, i.e. the buck converter is enabled, as soon as $V_{in}>V_{out+}V_{off}$ (Vin_att 30 is ON) and $V_{in}>V_{in\_low}$ (Vin_det 31 is ON), i.e. the buck converter is in the BUCK_ON RAMP UP state 51 as illustrated in FIG. 5. The reference current $I_{ref}$ and hence the input current limit $I_{lim}$ are ramped up to default value.

In phase 35 a system load causes $V_{in}$ to drop below $V_{in\_low}$ ($V_{in\_det}$ 31 goes low); nevertheless the buck converter remains enabled (En 32 is ON) but in this phase the reference current $I_{ref}$ and hence the input current limit is ramped down, i.e. the buck converter is in the BUCK_ON RAMP DOWN state 52 as illustrated in FIG. 5.

In phase 36 due to the reduced input current limit the voltage at the Vin port rises eventually above $V_{in\_low}$ ($V_{in}>V_{in\_low}$). In this phase the reference current $I_{ref}$ and hence the input current limit is ramped up to the default value again, i.e. the buck converter is in the BUCK_ON RAMP UP state 51.

In phase 37 the supply voltage is plugged out, hence $V_{in}$ drops below $V_{in\_low}$. The reference current $I_{ref}$ and hence the input current limit is ramped down but this will not prevent $V_{in}$ to drop below Vout. Nevertheless the buck remains enabled and provides power to the system as long as $V_{in}>V_{out}$, i.e. the buck converter is in the BUCK_ON RAMP DOWN state 52.

In phase 38 $V_{in}$ drops eventually below $V_{out}$ and the buck converter is disabled, i.e. the buck converter is in the BUCK_OFF state 50.

Due to the described procedure the buck converter will automatically adjust the input current limit to the output resistance (including cable interconnect resistance) of the power source preventing interruption of the power flow.

In the case the supply voltage is plugged out, the buck converter will first try to minimize the current drawn from the power source and will be only turned off when Vin<$V_{out}$.

Therefore under all circumstances, the buck converter of the present invention will maximize the power delivered to the system, by remaining active for the maximum possible time, i.e. until $V_{in}$<$V_{out}$.

Figure 1:
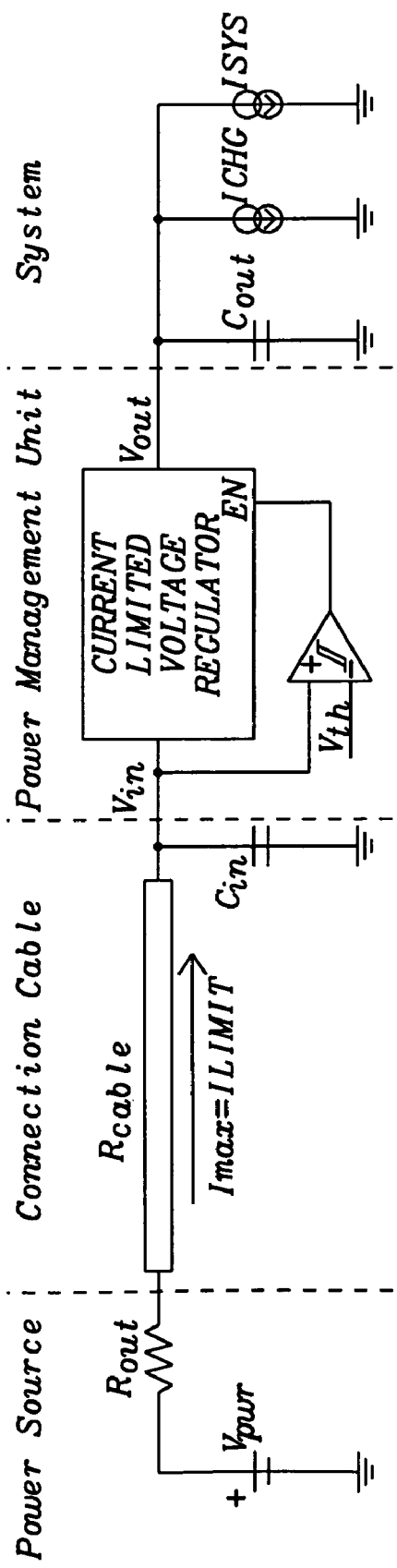
FIG. 1 prior art illustrates a current practice of an over-current protection and under-voltage protection scheme.

Summarizing, the described invention addresses particularly the case in which the current drawn from the system, albeit being lower than the current limit programmed for the specific power source, causes the input voltage $V_{in}$ to drop below input threshold voltage $V_{in\_low}$ (mainly because of the connection cable resistance or the low quality of the power source). In this case the control loop presented above insures:

1. That the buck converter or in general the system supply regulator is not shut-down (unlike the prior-art scheme of FIG. 1 prior art)
2. That the buck current limit is reduced in such a way to bring the voltage at $V_{in}$ node above the $V_{in\_low}$ threshold;

Furthermore, in the case the power source is plugged out, the buck converter of the present invention maximizes the time during which power is delivered to a load, since the power path is turned-off only when the input voltage falls below the output voltage.

It has to be understood that the present invention, outlined above in regard of an embodiment using a buck converter, can be obviously also applied to other kind of voltage regulators as e.g. to linear voltage regulators or buck converters having different implementations from the one described in the present invention, as long as they provide means to control the input current limit and to monitor the input-output voltages.

Figure 4:
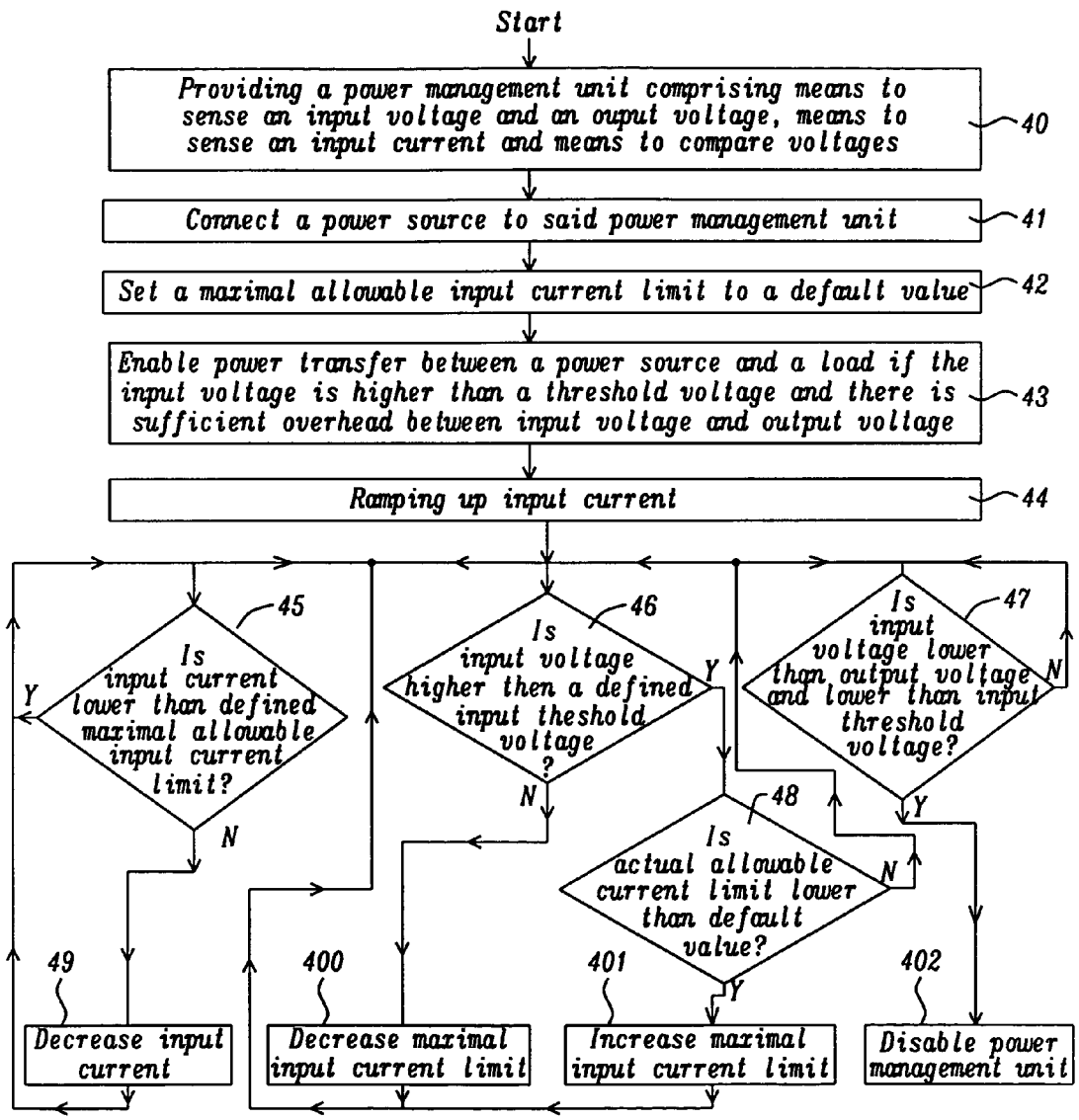
FIG. 4 illustrates a flowchart of a method invented to maximize the power transferred by a power management unit to a battery-operated system.

FIG. 4 illustrates a flowchart of a method invented to maximize DC power transferred by a power management unit to an electronic device. A first step 40 describes the provision of a power management unit comprising means to sense an input voltage and an output voltage, means to sense an input current, means to control the input current limit and means to compare voltages. The next step 41 describes connecting a power source to the power management unit and step 42 comprises setting a maximal allowable input current limit to a default value. The default value depends upon the type of power source actually plugged-in. Step 43 describes enabling power transfer between a power source and a load if the input voltage is higher than a threshold voltage and there is sufficient overhead between input voltage and output voltage; enabling power transfer between a power source and a load if the input voltage is higher than a threshold voltage and there is sufficient overhead between input voltage and output voltage; Only if both checks are positive the process flow goes to step 44 wherein the input current is ramped up as required. Steps 45-47 illustrate three checks executed in parallel.

Step 45 is a check if the input current is lower than the defined maximal allowable input current. If the check of step 45 is positive the check of step 45 is repeated again, otherwise the input current is decreased in step 49 and the process flow goes then back to step 45 again.

Step 46 is a check if the input voltage is higher than the defined input threshold voltage, if the check is negative the maximal allowable input current limit is decreased in step 400 and the process flow goes then back to step 46 again. If the check of step 46 is positive the process flow goes to step 48, which is a check if the actual allowable input current limit is lower than its default value. If the check of step 48 is negative the process flow goes back to step 46, otherwise the process flow goes to step 401, wherein the maximal allowable input current limit is increased, and then the process flow goes back to step 46.

Step 47 is a check if the input voltage is lower than the output voltage of the converter and lower than the input threshold. If the check is negative the process flow goes back to the check of step 47 again, otherwise the power management unit is disabled in step 402.

While the invention has been particularly shown and described with reference to the preferred embodiments thereof, it will be understood by those skilled in the art that various changes in form and details may be made without departing from the spirit and scope of the invention.

What is claimed is:

1. A method for maximizing DC power transferred by a power management unit to an electronic device comprising the steps of:
    (1) providing a power management unit comprising means to sense an input voltage and an output voltage, means to sense an input current, means to control the input current limit and means to compare voltages, and a control unit;
    (2) connecting a power source to said power management unit;
    (3) setting a maximal allowable input current limit to a default value;
    (4) enabling power transfer between a power source and a load if the input voltage is higher than a threshold voltage and there is sufficient overhead between input voltage and output voltage;
    (5) ramping up the input current;
    (6) checking, if the input current is lower than the defined maximal allowable input current limit, and, if positive, repeat the check of step (6), otherwise go to step (7);
    (7) decreasing input current and go to step (6);
    (8) checking if an input voltage is higher than the defined input threshold voltage and, if positive go to step (9), else go to step (11);
    (9) checking, if the actual maximal allowable current limit is lower than the default value, and if negative, go to step (8), otherwise go to step (10);
    (10) increasing the maximal allowable input current limit and go to step (8);
    (11) decreasing the maximal allowable input current limit and go to step (8);
    (12) checking, if the input voltage is lower than the output voltage of the power management unit and lower than input threshold voltage, if negative, repeat step (12), otherwise go to step (13); and
    (13) disabling the power management unit.

2. The method of claim 1 wherein said default value of the maximal allowable input current limit depends upon the power source connected.

3. The method of claim 1 wherein said power management unit is a buck DC-DC converter.

4. The method of claim 1 wherein said power management unit is a linear regulator.

5. The method of claim 1 wherein an overhead voltage is added to the output voltage before said comparing with the input voltage.

6. The method of claim 1 wherein said means to sense an input current comprises a current comparator comparing the input current of the power management unit with a reference current.

7. The method of claim 6 wherein a digital control block is setting said reference current.

8. The method of claim 7 wherein said reference is used to set the input current of the power management unit.

9. The method of claim 8 wherein said reference is used to set the input current of the power management unit via a current mirror to a main switch of the power management unit.

10. A power management unit enabled for dynamic adjustment of an input current limit comprising:
 a first voltage comparator, comparing an input voltage of the power management unit with a threshold voltage, wherein its output is used by a means of setting dynamically a maximum input current limit;
 a second voltage comparator, comparing an output voltage of the power management unit with said input voltage wherein its output is used by said means of setting dynamically a maximum input current limit;
 a current comparator, comparing said input current with a reference current wherein its output is an input to a control block;
 said means of setting dynamically a maximum input current limit;
 a main input switch of the power management unit; and
 said control block controlling the operations of the power management unit including enabling power transfer between a power source and a load if the input voltage is higher than a threshold voltage and there is sufficient overhead between input voltage and output voltage.

11. The system of claim 10 wherein said power management unit is a buck (DC-DC) converter.

12. The system of claim 10 wherein said power management unit is a linear regulator.

13. The system of claim 10 wherein said means of setting dynamically a maximum input current limit is a digital control unit having inputs and outputs, wherein a first input is the output of said first voltage comparator and a second input is the output of said second voltage comparator, and a first output is controlling a current source generating said reference current and a second output is a signal, which is enabling the power management unit to said control block.

14. The system of claim 13 wherein said means of setting dynamically a maximum input current limit is having as third input a signal describing a type of input power source wherein said setting of a reference current depends upon the type of current source.

15. The system of claim 10 wherein said control block is having inputs and an output wherein a first input is the output voltage of the power management unit, a second input are clock pulses, and a third input is an enablement signal from said means of dynamically setting a maximum input current limit, and a first output is controlling the input current of the power management unit.

16. The system of claim 15 wherein said control block is controlling the input current by closing the main input switch as long as the input current exceeds an input current limit.

* * * * *